J. J. WEIER.
DRIVING AND STEERING MECHANISM.
APPLICATION FILED MAY 11, 1917.
1,260,495.
Patented Mar. 26, 1918.
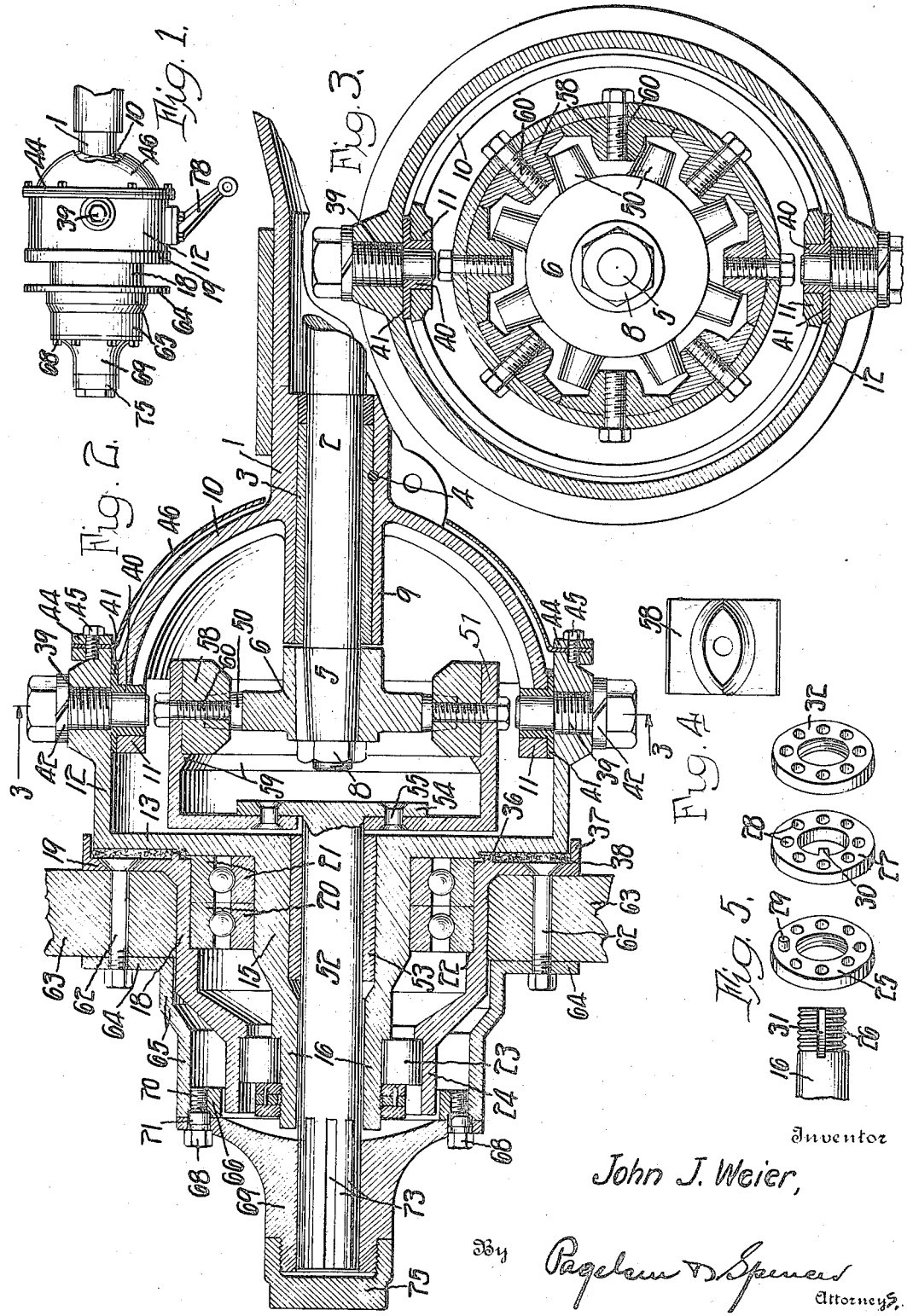

UNITED STATES PATENT OFFICE.

JOHN J. WEIER, OF BIRMINGHAM, MICHIGAN.

DRIVING AND STEERING MECHANISM.

1,260,495.  Specification of Letters Patent.  Patented Mar. 26, 1918.

Application filed May 11, 1917. Serial No. 167,991.

*To all whom it may concern:*

Be it known that I, JOHN J. WEIER, a citizen of the United States, and residing at Birmingham, in the county of Oakland and State of Michigan, have invented a new and Improved Driving and Steering Mechanism, of which the following is a specification.

The present invention relates to driving mechanism for the steering wheels of a motor vehicle, the object being to provide a device of this nature wherein the wheels are given a very small leverage against the action of the steering mechanism and wherein the hub is more effectually supported than heretofore. Among its important features are an improved pivot construction between the wheel spindle and the axle; an extension of the axle housing whereby the axle is supported close up to the driving gear thereon; detachable teeth on the inner surface of the swinging gear arranged to support one another circumferentially thereof; an improved mounting of the wheel hub on the spindle whereby the direct loads are taken for the most part on a relatively large bearing or bearings substantially in the plane of the wheel spokes, and whereby the tendency of the wheel to tilt is largely taken on a relatively small bearing located some distance outwardly beyond the plane of the wheel spokes; and an improved driving connection between the spindle axle and the wheel. The invention further consists in the details of construction shown, described and claimed.

In the drawings, Figure 1 is a fragmentary plan view, the wheel spokes being omitted, showing a preferred embodiment of the invention. Fig. 2 is a central longitudinal vertical section corresponding to Fig. 1. Fig. 3 is a section on the line 3—3 of Fig. 2. Fig. 4 is a face view of one of the driven teeth. Fig. 5 is a view showing more clearly the construction of the locking nut for retaining the hub and bearings on the spindle.

1 indicates the axle housing and 2 one section of a driving axle (that may receive its torque from a differential, not shown) which is supported in the housing by means of a suitable bushing 3 preferably keyed to the housing at 4. The projecting tapered end 5 of the axle has keyed or otherwise rigidly secured thereon a driving head or sprocket wheel 6 which may be held in position by the nut 8. At a point somewhat inside of the end 9 of the tubular portion of the housing the latter is provided with a substantially spherical head 10, in other words, the axle housing proper projects into the head in the form of an extension 9 and supports the axle well toward the center thereof.

Surrounding the outer face of the head 10 is a tubular spindle which includes the cylindrical barrel 12 and the perforated end wall 13 that, together with the head 10, inclose a chamber of considerable size. The spindle is continued on the side opposite the wall 13 in reduced diameter as indicated at 15 and is further reduced near its outer end at 16. Mounted on the reduced portion of the spindle is a tubular wheel hub 18 which includes the radial flange 19 parallel to and spaced slightly from the wall 13. The major part of the weight on the axle is transmitted from the portion 15 of the spindle to the inner end of the hub 18 through the medium of the two roller bearings 20 and 21 positioned between the wall 13 and a shoulder 22 on the hub. By making the bearings separate from one another greater flexibility is obtained than would be the case were a single bearing provided with two races used in lieu thereof. The tendency of the wheel to tilt is however largely prevented by the roller bearing 23 that is located between the reduced outer end 24 of the hub and the reduced end portion 16 of the spindle. The rollers, and with them the hub, are preferably retained on the spindle by means of a lock nut composed of the inner washer 25 in threaded engagement with the threads 26 on the end of the spindle, an intermediate washer 27 provided with a number of perforations 28 in any one of which a pin 29 on the washer 25 may be received and also provided with a lug or key 30 arranged to be received in the key way 31 on the spindle, and an outer locking washer 32 threaded on the spindle. By this means a very close adjustment may be made and wear may be easily taken up.

A proper seal between the hub and spindle is maintained by the annular ribs 36—37 and the interposed packing 38.

The connection whereby the spindle and hub are enabled to swing about the end of the housing 10 is preferably in the form of vertically alined pivots 39, threaded into bosses on the spindle and having their reduced cylindrical ends received in tubular bushings 40 inserted in the perforation in ears 11 on the housing member 10. Preferably, also, these bushings have flanges 41 interposed between the spindle and the ears to take the direct thrust. Lock washers 42 may be used to retain the pivots in place.

In order to exclude dust from the joint between the head and the spindle, the latter is provided with a ring 44 and cap screws 45 whereby a leather or fabric skirt 46 is secured thereto. The central portion of the skirt is of course cut away sufficiently to allow the necessary movement.

The sprocket or head 6 has driving teeth or pins 50 which are adapted to engage the teeth of an internally toothed barrel 51 rigid with a spindle shaft or extension 52 of the driving shaft, said spindle shaft being mounted in a bushing 53 in the spindle. The barrel and spindle shaft might be made in one piece, but it is preferred to provide the spindle shaft with a head 54 connected to the barrel by rivets 55. The teeth of the barrel 51 are preferably formed from a series of blocks 58 that are pressed into the barrel until they bear against the shoulder or rib 59 and individually retained by the cap screws 60. The faces of the teeth are curved in the manner indicated in Fig. 4 to allow the necessary movement of the pins 50 relative thereto when the wheel is swung at an angle to the axle; and the contact of each tooth with those adjacent thereto insures the transmission of torque through a number of the cap screws at all times.

Connected to the hub by means of bolts 62 that pass through the spoke structure 63 is an outer (or driving) hub section which includes the flange 64 and the barrel 65 the outer end of the latter of which is spaced somewhat from the reduced outer end of the hub section and provided with the annular inturned flange 66 into which the cap screws 68, whereby the driving cap 69 of the hub is secured thereto, are screwed. As shown, these screws include the reduced threaded ends 70 and the larger body portions 71 (whereby a maximum shearing strength is obtained) but ordinary cap screws may be substituted therefor. The splines 73 transmit torque from the spindle shaft 52 to the driving cap 69, and a threaded dust cap 75 completes the construction. As stated above, the spindle and wheel are fully braced and the latter has but a short lever arm against the steering arm 78.

The details of the construction may be varied considerably in certain particulars without departing from the spirit of the invention, and I do not, therefore, wish to be limited otherwise than as indicated by the subjoined claims.

I claim:—

1. A motor vehicle including a driving shaft having an externally toothed head thereon, a spindle shaft swingable in respect to the driving shaft about a vertical axis, said spindle shaft having rigid therewith a cup shaped element having a series of detachable teeth projecting from its inner surface, said teeth meshing with the externally toothed head to be driven thereby at all angular positions of the spindle.

2. A motor vehicle comprising a driving shaft having an externally toothed head thereon, a spindle shaft swingable in respect to the driving shaft about a vertical axis, said spindle shaft having rigid therewith an internally toothed barrel adapted to mesh with the externally toothed head to be driven thereby at all angular positions of the spindle, said internally toothed barrel including a plurality of detachable teeth in engagement with each other circumferentially of the barrel.

3. A motor vehicle comprising a driving shaft having an externally toothed head thereon, a spindle shaft swingable in respect to the driving shaft about a vertical axis, said spindle shaft having rigid therewith an internally toothed barrel adapted to mesh with the externally toothed head to be driven thereby at all angular positions of the spindle, said internally toothed barrel including a plurality of detachable teeth in engagement with each other circumferentially of the barrel, the teeth being insertible into the barrel from the end thereof opposite the spindle shaft, and a circumferential shoulder on the inner surface of the barrel for determining the relative alinement of said teeth.

4. A motor vehicle comprising a driving shaft having an externally toothed head thereon, a spindle shaft swingable in respect to the driving shaft about a vertical axis, said spindle shaft having rigid therewith an internally toothed element adapted to mesh with the externally toothed head to be driven thereby at all angular positions of the spindle, said internally toothed element including a barrel, a plurality of detachable teeth projecting from the inner surface of the barrel, and a plurality of threaded members passing through the barrel for securing the teeth in position.

5. A motor vehicle including a wheel having a hollow hub, a hollow spindle projecting into said hub, a housing, a driven shaft in the housing, said spindle having a deep perforated end wall substantially in the plane of the inner surface of the wheel, a bearing interposed between the spindle and the hub substantially in the plane of the wheel, annular sealing means interposed between the end wall and the inner surface of the wheel outside of the bearing, and a spindle shaft projecting through the spindle for driving the hub from the first mentioned shaft.

6. A motor vehicle including an axle housing, a wheel spindle embracing the outer end of said housing and pivoted to swing in respect to said housing about a vertical axis, a flexible dust excluding skirt carried by said spindle and embracing the end of said axle housing, and means including a ring whereby the outer edge of said skirt is secured to the spindle.

7. In combination with a fixed portion of a vehicle, a wheel spindle swingable in respect thereto about a vertical axis, a wheel hub rotatable about said spindle, a wheel structure arranged to receive loads from the hub in a plane near the inner end of the latter, and somewhat outside of said vertical axis, said spindle being of greater diameter in said plane than at a point outwardly therefrom, the wheel hub also being of greater diameter near said plane than at a point outwardly therefrom, a bearing of relatively large diameter interposed between the relatively large portions of the spindle and hub, and a bearing of relatively small diameter interposed between the relatively small portions of the spindle and hub, a driving shaft projecting through the spindle, and a bearing interposed between said spindle and driving shaft substantially in the plane of the first mentioned bearing.

8. A motor vehicle including a wheel structure having an inner hub member and an outer hub member, each of the hub members having an annular flange on its inner end, each hub member also including an outwardly projecting tubular portion, the tubular portions being spaced from one another, a hollow spindle mounted to swing about a vertical axis and projecting into the inner hub member, a driving shaft, a spindle shaft connected to the driving shaft and driven thereby in all angular positions of the spindle, means for driving the wheel structure substantially entirely through the outer hub member, and means for supporting the wheel structure substantially wholly through the inner hub member.

JOHN J. WEIER.